United States Patent
Binns

[11] 3,880,042
[45] Apr. 29, 1975

[54] BLIND RIVET
[76] Inventor: Lloyd Sylvester Binns, Garden Grove, Calif.
[22] Filed: Aug. 28, 1973
[21] Appl. No.: 392,262

Related U.S. Application Data
[63] Continuation-in-part of Ser. No. 249,562, May 2, 1972, abandoned.

[52] U.S. Cl. .......................................... 85/72; 85/77
[51] Int. Cl. ............................................. F16b 13/06
[58] Field of Search ................. 85/77, 78, 72, 19, 21

[56] References Cited
UNITED STATES PATENTS

| | | |
|---|---|---|
| 2,095,153 | 10/1937 | Rosenberg .............................. 85/19 |
| 2,369,670 | 2/1945 | Gookin ................................... 85/77 |
| 2,756,624 | 7/1956 | Austin ..................................... 85/78 |
| 2,954,718 | 10/1960 | Bricmyer ................................ 85/78 |
| 3,148,578 | 9/1964 | Gapp ...................................... 85/77 |
| 3,279,303 | 10/1966 | Shackelford ........................... 85/78 |
| 3,491,649 | 1/1970 | Smouton et al. ....................... 85/72 |

FOREIGN PATENTS OR APPLICATIONS

| | | |
|---|---|---|
| 585,886 | 2/1947 | United Kingdom .................... 85/77 |
| 602,652 | 5/1948 | United Kingdom .................... 85/77 |
| 625,331 | 6/1949 | United Kingdom .................... 85/73 |
| 1,101,030 | 1/1968 | United Kingdom .................... 85/77 |

Primary Examiner—Marion Parsons, Jr.
Attorney, Agent, or Firm—Ambrose & Silber

[57] ABSTRACT

A blind rivet includes a rivet sleeve expanded by sets of flanges projecting laterally from adjacent the blind end of a mandrel extending through the sleeve. The sets of flanges are mutually axially and radially offset. When the mandrel is pulled, a first set of flanges initially expands the sleeves in a radially non-uniform pattern. Continued pulling causes the first set of flanges to shear from the mandrel and translate toward the blind end as the second set of flanges expand the sleeve.

25 Claims, 15 Drawing Figures

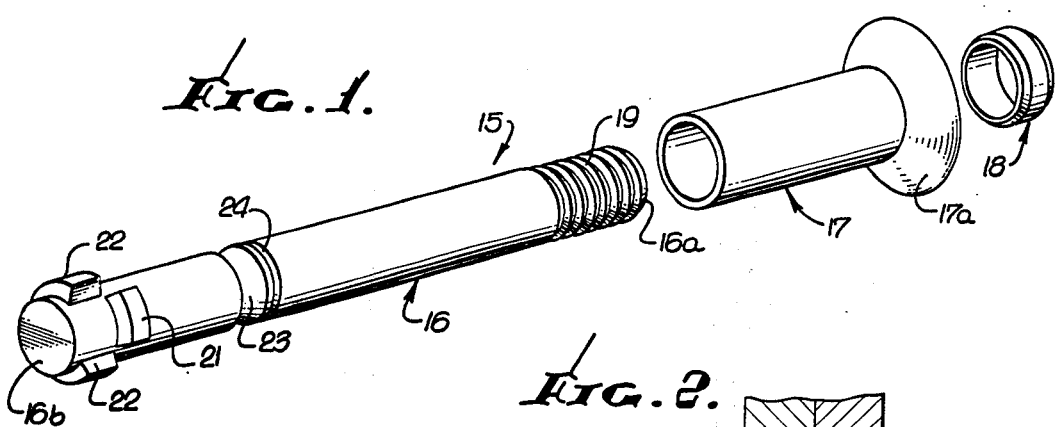
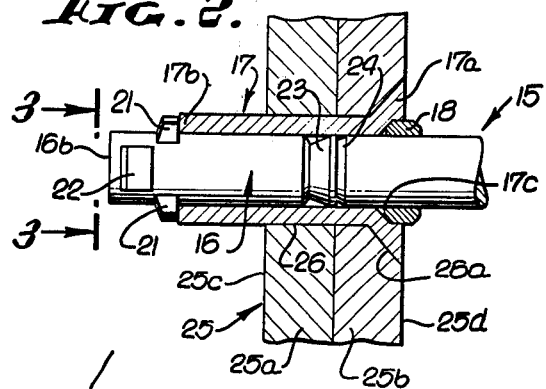
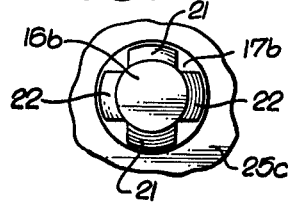
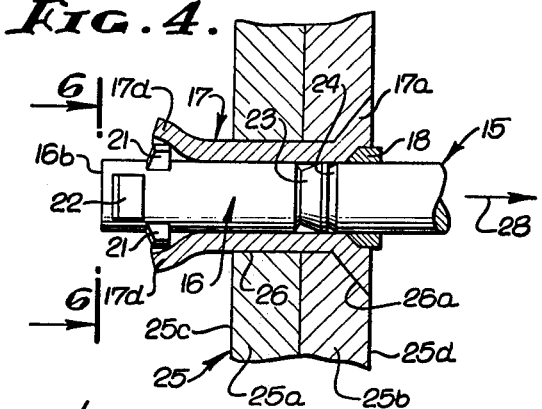
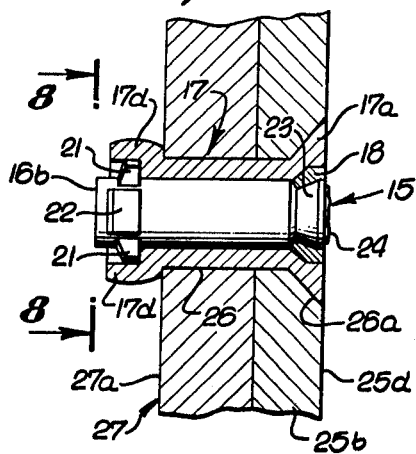
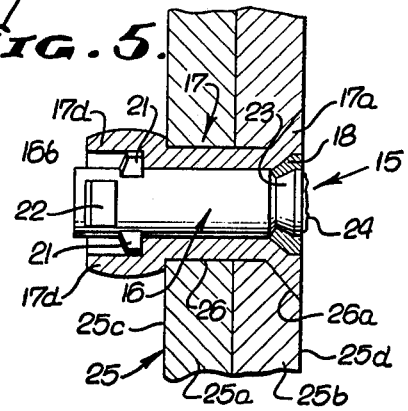

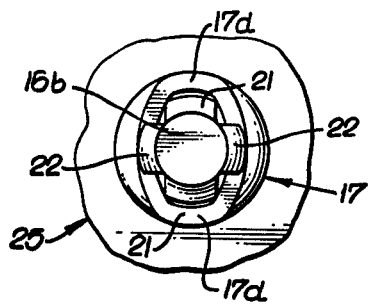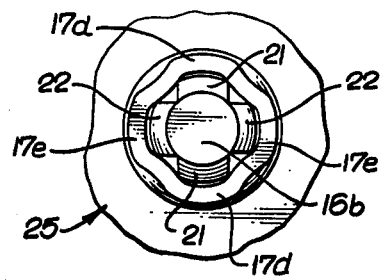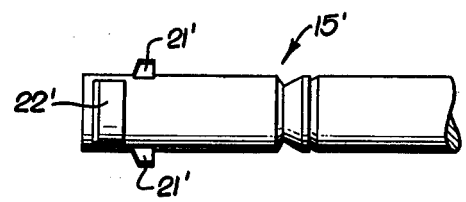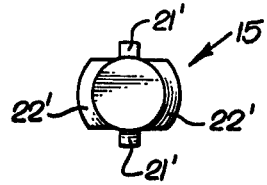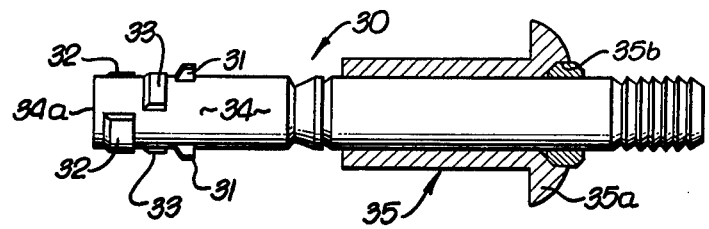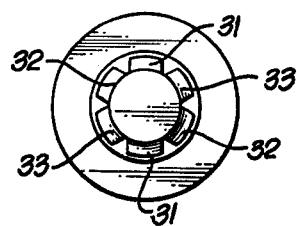

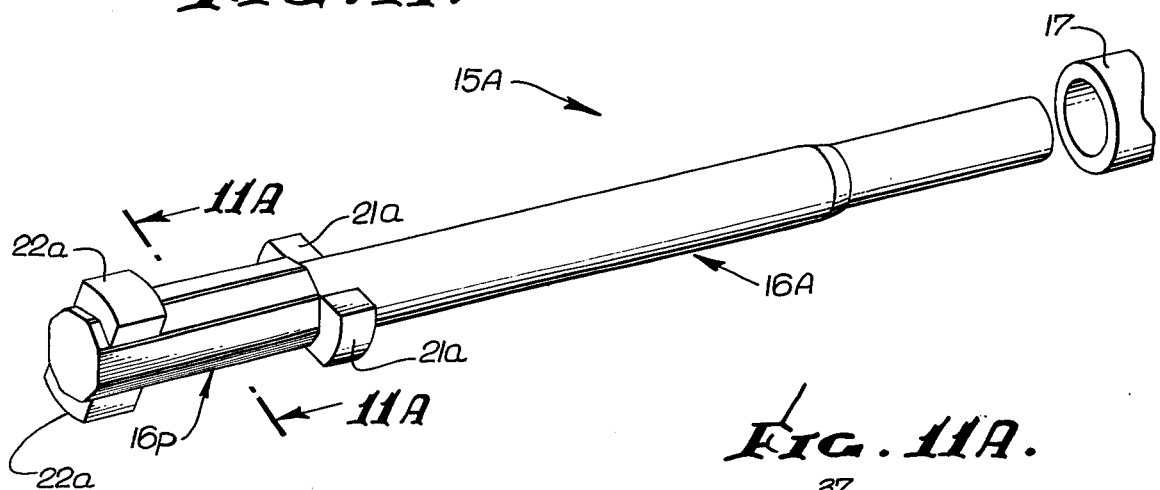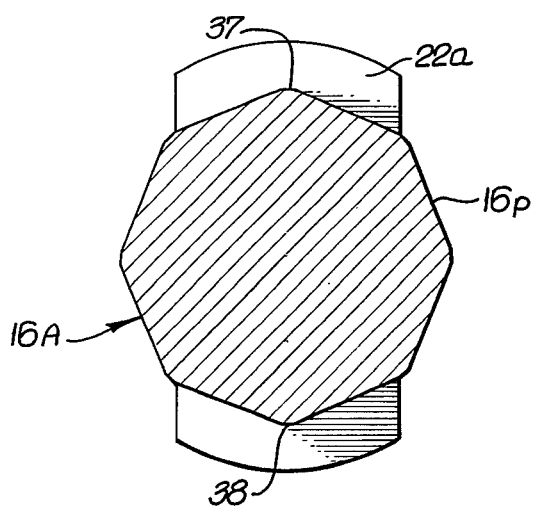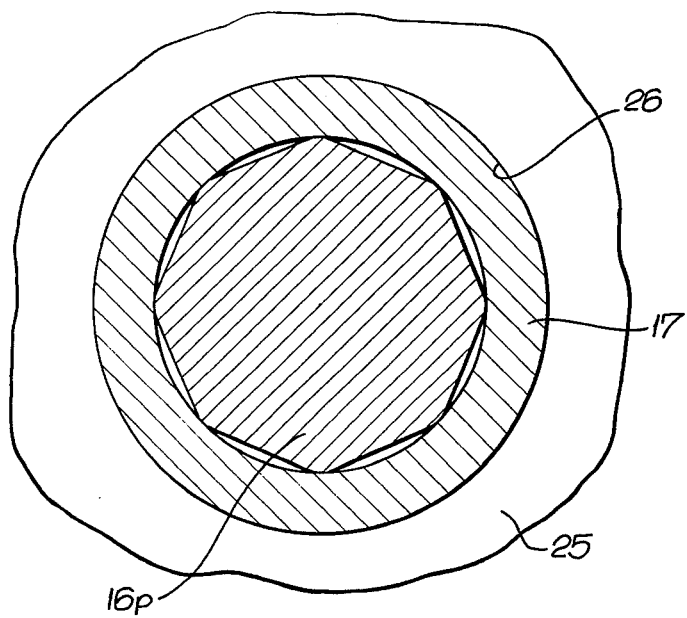

3,880,042

BLIND RIVET

RELATED APPLICATONS

This application is a Continuation-In-Part of my copending U.S. Pat. application, Ser. No. 249,562, filed May 2, 1972 now abandoned.

BACKGROUND OF THE INVENTION

1. Field of the Invention

The present invention relates to a blind rivet having mutually axially and radially offset sleeve-expanding flanges.

2. Description of the Prior Art

Blind rivets are widely used in fastening applications where one side of the workpiece is inaccessible. Typically the blind rivet includes a mandrel (also called a stem or spindle) and a surrounding rivet sleeve or body which together are inserted through a hole in the workpiece. The exposed end of the mandrel has shallow annular grooves engaged by a riveting tool equipped with a pulling head. As the mandrel is pulled, the inserted end of the mandrel mechanically expands the sleeve against the inaccessible side of the workpiece. A collar locks an annular flange on the sleeve against the outside surface of the workpiece. The protruding portion of the mandrel is broken off to complete the installation.

Various types of sleeve-expanding mandrel elements are known. For example, the tail of the mandrel may be flared to a diameter equal to or less than that of the sleeve. An annular shear ring may be provided on the flared tail, as shown in the U.S. Pat. No. 3,148,578 to Gapp. When the mandrel is pulled, the shear ring uniformly subjects the sleeve to axial compression, causing it to bulge. As the pulling continues, the sleeve end forms a relatively large diameter bulbed head against the inaccessible side of the workpiece. The shear ring penetrates within this head. Further pulling causes the ring to shear off and slide along the flared stem which itself seats within the bulbed blind head of the rivet sleeve. In the blind rivet described in the U.S. Pat. No. 3,489,056 to Blakeley, the stem head is wire drawable through a shear ring to accommodate workpieces of different thickness.

A common shortcoming of prior art blind rivets is that the sleeve must be made of a material having substantially lower tensile strength than the mandrel. Typically the sleeve was fabricated of an aluminum alloy having a tensile ultimate strength of about 40,000 p.s.i., while the mandrel comprised an alloy steel with an ultimate tensile strength greater than 190,000 p.s.i. This difference in tensile strength was necessitated partly because the expansion force exerted by the blind end of the mandrel was distributed uniformly around the sleeve periphery. Only by using a sufficiently "soft" material could radial expansion of the sleeve be insured to form the bulbed blind head. One object of the present invention is to provide a blind rivet requiring significantly less difference in tensile strength between the stem and the mandrel, permitting the stem to be fabricated of considerably stronger material than previously possible.

Another object of the invention is to provide a blind rivet having novel sleeve-expanding elements which permit the rivet to be used on workpieces with a range of thicknesses. The inventive blind rivet can be fabricated without induction annealing, thus reducing manufacturing costs significantly compared with prior art rivets which required such annealing. Further, the locking collar of the rivet disclosed herein can be emplaced with a non-shifting pulling head. Yet another object is to provide a hole-filling blind rivet which eliminates gaps between the installed sleeve and the hole through the workpiece. Such a rivet embodiment eliminates a significant prior art problem, in that the portion of the rivet sleeve within the workpiece often did not completely fill the installation hole, so that rattling and lateral motion of the installed rivet was not uncommon.

SUMMARY OF THE INVENTION

These and other objectives are achieved by providing a blind rivet having sets of sleeve-expanding flanges adjacent the blind end of the mandrel. The sets of flanges are spaced at different distances from the blind end, and are positioned about the periphery of the mandrel so that no flange radially overlaps any other flange.

As the mandrel is pulled, the flanges farthest from the blind end initially expand the sleeve in a radially non-uniform pattern. For a workpiece of minimum thickness, the lower flanges seat within the expanded sleeve to form the rivet blind head. For a thicker workpiece, continued pulling causes the "lower" flanges to shear from the mandrel and translate axially toward the mandrel end as the other flanges expand the sleeve in a different radial pattern. Partly as a result of the radially non-uniform expansion, the rivet sleeve may be fabricated of a material having significantly higher tensile strength than was possible in the prior art.

The mandrel may be provided with a generally conical locking groove. During rivet installation, an annular collar is forced into the groove to lock the rivet sleeve to the mandrel. In a preferred embodiment, two pairs of flanges are arranged to present a cruciform when viewed from the mandrel blind end. The lower, shear flanges are of lesser axial extent than the upper flanges. In other embodiments the number, radial arrangement, axial position and axial extent of the flanges may vary. For example, three sets of flanges at different axial distances from the mandrel end may be employed.

BRIEF DESCRIPTION OF THE DRAWINGS

A detailed description of the invention will be made with reference to the accompanying drawings, wherein like numerals designate corresponding elements in the several figures. These drawings are to scale.

FIG. 1 is a perspective view showing the three components of a preferred embodiment of the inventive blind rivet.

FIG. 2 is a side view, partly in section, showing the blind rivet of FIG. 1 inserted through a workpiece at the start of installation.

FIG. 3 is an end view of the rivet as seen along the line 3—3 of FIG. 2.

FIGS. 4 and 5 are side views like FIG. 2 showing installation of the blind rivet in a workpiece of minimum thickness.

FIG. 6 is an end view of the rivet installed per FIG. 4, as seen along the line 6—6 thereof and showing the radially non-uniform expansion of the rivet sleeve.

FIG. 7 is a side view, partly in section, showing installation of the rivet of FIG. 1 in a workpiece of maximum thickness.

FIG. 8 is an end view of the rivet installed per FIG. 7, as seen along the line 8—8 thereof.

FIGS. 9 and 9A respectively are side and end views of a blind rivet having a different flange arrangement.

FIGS. 10 and 10A respectively are side and end views of a blind rivet having three sets of axially and radially offset, sleeve-expanding flanges.

FIG. 11 is a side view of another blind rivet having an enlarged mandrel portion between the spaced sets of flanges to urge complete hole filling by the rivet sleeve.

FIG. 11A is a transverse sectional view of the blind rivet of FIG. 11 as seen along the lines 11A—11A thereof.

FIG. 12 is a transverse sectional view of the blind rivet of FIG. 11 after installation.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Operational characteristics attributed to forms of the invention first described also shall be attributed to forms later described, unless such characteristics are obviously inapplicable or unless specific exception is made.

In the preferred embodiment of FIGS. 1, 2 and 3, a blind rivet 15 includes a mandrel 16 which slidingly receives a rivet sleeve 17 and an annular locking collar 18. One end 16a of the mandrel 16 is provided with shallow annual grooves 19 for engagement by the pulling head (not shown) of a conventional riveting tool. Adjacent the other, "blind" end 16b of the mandrel 16 are provided a lower pair of sleeve-expanding shear flanges 21 and an upper pair of non-shearing, sleeve-expanding flanges 22. The flanges 21 are diametrically opposed, and are radially offset by 90° from the flanges 22 which also are diametrically opposed. Thus the flanges 21 and 22 together present a cruciform shape when viewed from the mandrel blind end 16b. There is no radial overlap between any of the flanges 21, 22 each of which has a radial extent slightly less than 90° in the embodiment shown. The flanges 21 are situated further from the mandrel end 16b, and are of lesser axial extent than the flanges 22.

The sleeve 17 includes a flanged end 17a, also known as a manufactured head. In the embodiment of FIG. 1, the end 17a is of flush head style.

The mandrel 16 also includes a generally conical locking groove 23 which cooperates with the collar 18 to lock the sleeve flanged end 17a to the mandrel 16 during installation. Although not illustrated, the collar 18 may be split. A break notch 24 aids break-off of the mandrel 16 when installation is complete.

The blind rivet 15 advantageously is used to fasten together two sheets of material 25a, 25b (FIG. 2) comprising a workpiece 25 of minimum thickness. The mandrel 16 and sleeve 17 together are inserted into an aligned hole 26 through the workpiece 25 so that the blind end 16b and sleeve end 17b project beyond the inaccessible workpiece surface 25c. The conical sleeve flange 17a seats within a counterbore 26a extending to the accessible workpiece side 25d. The collar 18 may be positioned loosely within a counterbore 17c in the sleeve flange 17a. The mandrel end 16a is accessible for attachment of the pulling head.

As the mandrel is pulled in the direction of the arrow 28 (FIG. 4), the lower flanges 21 cause lateral expansion of the sleeve end 17b. As shown in FIG. 6, this expansion is not radially uniform; maximum expansion of the sleeve 17 occurs in the sectors 17d corresponding in radial orientation to the flanges 21. Further pulling causes the flanges 21 to force the expanded sleeve 17b against the workpiece surface 25c (FIG. 5); concurrently the locking groove 23 approaches alignment with the sleeve counterbore 17c. The collar 18 is forced by the pulling tool into the groove 23 to lock the sleeve 17 to the stem 16. The protruding portion of the mandrel 16 is broken off at the break notch 24 to complete the installation.

For a workpiece 27 of maximum thickness (FIG. 7), further pulling of the mandrel 16 causes the lower flanges 21 to shear from the mandrel 16 and translate axially toward the blind end 16b. The upper flanges 22 further expand the sleeve end 17b along sectors 17e (FIG. 8) different from those expanded by the flanges 21. The flanges 22 force the expanded sleeve end 17b against the workpiece inaccessible surface 27a to accomplish fastening of this maximum thickness workpiece. The axially translated sheared flanges 21 are embedded within the bulbed rivet head formed by the sleeve 17. Of course, the blind rivet 15 may be used to fasten a workpiece of any thickness in the range between the minimum and maximum thicknesses illustrated. Further, the cruciform head design of the rivet 15 provides the installed mandrel 16 with a counterrotational lock insuring that the rivet will not become loose even under vibrational circumstances.

Expansion of the rivet sleeve 17 (FIGS. 4 – 8) occurs in stages. Initially the lower flanges 21 expand the sleeve sectors 17d along one radial axis; subsequently the upper flanges 22 expand the sleeve sectors 17e along a different radial axis. This radially non-uniform expansion permits the sleeve 17 to be fabricated of a hard material. For example, the sleeve 17 may comprise an alloy steel exhibiting an ultimate tensile strength of about 130 p.s.i. The mandrel 16 may be fabricated of an alloy steel having an ultimate tensile strength of about 180 p.s.i. The difference in tensile strength between sleeve and mandrel for the inventive rivet 15 thus is substantially less than for prior art blind rivets.

The rivet 15 may be formed in five simple operations, namely; (1) head the mandrel, (2) head the sleeve, (3) thread roll the mandrel, (4) heat treat the mandrel, and (5) heat treat the sleeve. There is no need to anneal selectively only the tail end of the sleeve, a problem which significantly increased the cost of prior art blind rivets.

The present invention is by no means limited to the flange arrangement shown in FIG. 1. The number of flanges may be varied, as may the axial and radial orientation and length of the flanges. For example, in the blind rivet 15' of FIGS. 9 and 9A, the lower flanges 21' are of lesser radial extent than the upper flanges 22'. The axial spacing between the flanges 21' and 22' also differs from that of the rivet 15.

Shown in FIGS. 10 and 10A is another embodiment of the invention useful over a wide range of workpiece thickness. The rivet 30 has three sets of sleeve-expanding flanges, including a lower pair of shear flanges 31, an intermediate pair of shear flanges 32 and an upper pair of non-shearing flanges 33. The flanges 31, 32, 33 are approximately equal in radial extent, and are oriented on the mandrel 34 so that no flange radially overlaps any other flange. The rivet 30 may utilize a sleeve 17 as shown in FIG. 1 or a sleeve 35 having a universal head 35a provided with a counterbore 35b to receive the locking collar 18.

When the rivet 30 is installed in a workpiece of minimum thickness, the lower flanges 31 provide the necessary sleeve expanding function, analogous to FIG. 5. For a workpiece of intermediate thickness, the flanges 31 will shear and translate axially toward the mandrel blind end 34a as the intermediate flanges 32 expand the sleeve 17 or 35 to form the rivet blind head. When fastening a workpiece of maximum thickness, both the lower flanges 31 and the intermediate flanges 32 will shear from the mandrel 34 and translate axially toward the blind end 34a until aligned with the upper flanges 33. The flanges 33 will not shear, and will form a rivet blind head analogous to that shown in FIG. 7.

Although not shown, the mandrel 16 may include axial knurling intermediate the breaknotch 24 and the grooves 19 for the purpose of preventing dissembly of the rivet sleeve 17 and the collar 18 prior to installation.

FIGS. 11 and 11A show another blind rivet 15A configured to insure complete hole filling by the sleeve 17. To this end, the two sets of sleeve-expanding flanges 21a, 22a are separated. The mandrel portion 16p between the separated flanges 21a, 22a is of geometrical cross-section, and for example may have the octagonal appearance shown in FIG. 11A. The major diameter (e.g., the distance between opposite edges 37 and 38) of the geometrical mandrel portion 16p preferably is slightly larger than the inner diameter of the sleeve 17. The minor diameter of the same mandrel portion 16p may be equal to or slightly less than the sleeve 17 inner diameter. With this configuration, as the flanges 21a shear from the mandrel 16A and translate rearwardly thereof during rivet installation, the mandrel portion 16p will laterally urge the sleeve 17 into complete hole filling relationship with the workpiece 25, as shown in FIG. 12.

Intending to claim all novel, useful and unobvious features shown or described, the applicant:

I claim:

1. In a blind rivet of the type having a rivet sleeve and a mandrel extending through said sleeve, one end of said mandrel being adapted for engagement by a pulling head, the improvement wherein said mandrel includes, adjacent the other, blind end thereof, mutually radially and axially offset first and second flanges, pulling on said mandrel one end during installation of said rivet initially causing said first flange to expand said sleeve, additional pulling causing said first flange to shear and translate axially toward said blind end as said second flange expands said sleeve.

2. A blind rivet according to claim 1 wherein said mandrel blind end has more than one first flange and more than one second flange, said flanges extending laterally from said mandrel and being positioned about the periphery thereof so that no flange radially overlaps any other flange.

3. A blind rivet according to claim 2 wherein each of said first flanges is spaced axially a first distance from said mandrel blind end and wherein each of said second flanges is spaced axially a second, shorter distance from said blind end.

4. A blind rivet according to claim 3 further comprising one or more third flanges laterally extending from said mandrel at an axial distance from said blind end intermediate said first and second distances, said third flanges being mutually radially offset from said first and second flanges.

5. A blind rivet according to claim 2 including a diametrically opposed pair of first flanges and a diametrically opposed pair of second flanges, said second flanges being radially offset by approximately 90° from said first flanges to present a cruciform shape when viewed from the blind end of said mandrel.

6. A blind rivet according to claim 1 wherein said mandrel further includes a peripheral, generally conical locking groove intermediate the ends thereof, said rivet further including an annular locking collar surrounding said mandrel between said sleeve and said one end and adapted to be forced into said locking groove to lock said sleeve to said mandrel.

7. A blind rivet according to claim 1 wherein said sleeve and said mandrel both are fabricated of steel, said mandrel having a higher tensile strength than said sleeve.

8. A blind rivet according to claim 1 wherein said first and second flanges are axially separated and wherein the portion of said mandrel between said separated flanges is geometrically configured with a maximum diameter slightly greater than the inner diameter of said sleeve, said mandrel portion urging radial expansion of said sleeve during pulling of said mandrel subsequent to shearing of said first flange to accomplish complete hole filling.

9. A blind rivet comprising:
a mandrel having one end configured for engagement by a pulling head and having adjacent the other end first and second sets of lateral, sleeve-expanding flanges, said flanges having non-overlapping radial orientations, said first set of flanges being axially spaced further from said mandrel other end than said second set, flanges of said first set shearing from said mandrel and translating axially toward said other end as said mandrel is pulled by said pulling head, and
a rivet sleeve slidably surrounding said mandrel and having an annular flange at the end facing said mandrel one end, the other end of said sleeve being expandable by at least one set of flanges to grip a workpiece between said annular flange and said expanded sleeve.

10. A blind rivet according to claim 9 wherein said mandrel includes a collar locking groove, said rivet further comprising an annular locking collar forceable into said groove to lock said mandrel to the flanged end of said sleeve.

11. A blind rivet according to claim 9 wherein said first and second sets each comprise a pair of diametrically opposed flanges, the flanges of said first set being radially offset by approximately 90° from the flanges of said second set to present a cruciform shape when viewed from said mandrel other end.

12. A blind rivet according to claim 11 wherein the flanges of said first set are of lesser axial extent than the flanges of said second set.

13. A blind rivet according to claim 9 wherein flanges of said first set are of different axial extent from flanges of said second set.

14. A blind rivet according to claim 9 wherein flanges of said first set are of different radial extent from flanges of said second set.

15. In a blind rivet of the type having a rivet sleeve and a mandrel extending through said sleeve, one end of said mandrel being adapted for engagement by a pulling tool, a portion of said mandrel being locked within said sleeve upon completion of rivet installation, the improvement wherein said mandrel includes, adjacent the other end thereof, at least one set of laterally projecting, mutually radially offset flanges, said one set of flanges effecting radially non-uniform expansion of said sleeve when said mandrel is pulled axially through said sleeve during rivet installation, and wherein each flange of said set has;
 a. a substantially planar front face oriented toward said mandrel one end, the plane of said front face being approximately perpendicular to the longitudinal axis of said mandrel,
 b. a substantially planar rear face oriented toward said mandrel other end, the plane of said rear face being inclined rearwardly at an acute angle with respect to a plane perpendicular to said mandrel longitudinal axis, the bottom edge of said rear face being spaced from said mandrel other end, and
 c. substantially planar side faces each in a plane generally perpendicular to said flange front face.

16. A blind rivet according to claim 15 wherein the total radial extent of the flanges of said one set is less than 360°.

17. A blind rivet according to claim 15 wherein said one set has a single flange of limited radial extent.

18. A blind rivet according to claim 15 wherein said one set includes a pair of flanges each of limited radial extent, said flanges being diametrically opposed on said mandrel.

19. In a blind rivet of the type having a rivet sleeve and a separate mandrel extending through said sleeve, one end of said mandrel being adapted for engagement by a pulling tool, a portion of said mandrel being locked within said sleeve upon completion of rivet installation, the improvement wherein said mandrel includes, adjacent the other end thereof, at least one set of laterally projecting, mutually radially offset flanges, said one set of flanges effecting radially non-uniform expansion of said sleeve when said mandrel is pulled axially through said sleeve during rivet installation, and wherein said mandrel also has, adjacent said other end, a second set of laterally projecting flanges mutually axially and radially offset from said one set, the flanges of said one and said second sets effecting radially non-uniform expansion of said sleeve sequentially at different sectors thereof as said mandrel is pulled axially partway through said sleeve during rivet installation.

20. A blind rivet according to claim 19 wherein the flanges of said one set first effect radial expansion of certain sectors of said sleeve, said flanges of said one set shearing from said mandrel and translating axially toward said mandrel other end as flanges of said second effect radial expansion of other sectors of said sleeve.

21. A blind rivet according to claim 15 wherein said flanges expand one end of said sleeve, and further comprising a locking collar insertable adjacent the other end of said sleeve into a groove in said mandrel to lock said mandrel within said sleeve after said radially non-uniform sleeve expansion has been effected.

22. A blind rivet according to claim 19 wherein said one and second sets of flanges are axially separated and wherein the portion of said mandrel between said separated sets of flanges is geometrically configured with a maximum diameter slightly greater than the inner diameter of said sleeve, said mandrel portion urging radial expansion of said sleeve during pulling of said mandrel subsequent to shearing of said one set of flanges to accomplish complete hole filling.

23. In a blind rivet of the type including a sleeve and a mandrel having laterally projecting, sleeve expansion flanges, the improvement comprising:
 mutually radially and axially offset flanges near the end of said mandrel for sequentially radially non-uniformly expanding said sleeve as said mandrel is pulled axially partway through said sleeve during rivet installation.

24. A blind rivet according to claim 23 wherein said flanges are axially separated and wherein the portion of said mandrel between said separated flanges is geometrically configured with a maximum diameter slightly greater than the inner diameter of said sleeve, said mandrel portion urging radial expansion of said sleeve during pulling to accomplish complete hole filling.

25. A blind rivet comprising:
 a mandrel having one end configured for engagement by a pulling head and having adjacent the other end first and second sets of lateral, sleeve-expanding flanges, said sets being differently axially spaced from said other end, said flanges having non-overlapping radial orientations, and
 a rivet sleeve slidably surrounding said mandrel and having an annular flange at the end facing said mandrel one end, the other end of said sleeve being radially non-uniformly expandable by at least one set of flanges to grip a workpiece between said annular flange and said expanded sleeve, said expanded sleeve forming a radially non-uniform bulbed rivet head exterior of said workpiece and containing said flanges, a portion of said mandrel being locked within said sleeve when said rivet is installed.

* * * * *